United States Patent [19]

Buchholz

[11] Patent Number: 4,732,063
[45] Date of Patent: Mar. 22, 1988

[54] APPARATUS FOR CHANGING A POSITION OF A CUTTING EDGE OF A LATHE TOOL

[75] Inventor: Reinhard Buchholz, Tamm, Fed. Rep. of Germany

[73] Assignee: Huller Hille GmbH, Fed. Rep. of Germany

[21] Appl. No.: 861,403

[22] Filed: May 9, 1986

[30] Foreign Application Priority Data

Aug. 21, 1985 [DE] Fed. Rep. of Germany ....... 3529876

[51] Int. Cl.⁴ .............................................. B23B 19/00
[52] U.S. Cl. ....................................... 82/1.4; 408/156; 408/154
[58] Field of Search ...................... 82/1.2, 1.3, 1.4, 1.5, 82/63; 408/154, 155, 156, 714

[56] References Cited

U.S. PATENT DOCUMENTS

| | | | |
|---|---|---|---|
| 1,668,119 | 5/1928 | McArthur | 82/1.5 |
| 2,058,359 | 10/1936 | Schmidt | 408/154 |
| 2,224,386 | 12/1940 | Guild | 82/1.4 |
| 2,257,402 | 9/1941 | Scott et al. | 82/1.2 |
| 2,368,846 | 2/1945 | Klomp | 408/156 |
| 3,200,673 | 8/1965 | Pfeifer | 408/154 |
| 4,573,380 | 3/1986 | Bald | 82/1.2 |

FOREIGN PATENT DOCUMENTS

| | | | |
|---|---|---|---|
| 574278 | 9/1977 | U.S.S.R. | 82/1.2 |
| 1038089 | 8/1983 | U.S.S.R. | 82/1.2 |

Primary Examiner—Nicholas P. Godici
Assistant Examiner—Carmine Cuda
Attorney, Agent, or Firm—Antonelli, Terry & Wands

[57] ABSTRACT

A method and device for changing a position of a cutting edge of a lathe tool, whereby the position is changed or altered in dependence upon a rotational frequency and a speed of rotation, respectively, that is, in dependence upon a centrifugal force.

3 Claims, 5 Drawing Figures

APPARATUS FOR CHANGING A POSITION OF A CUTTING EDGE OF A LATHE TOOL

BACKGROUND OF THE INVENTION

The present invention relates to an apparatus for changing a convolution circle or turned diameter of a cutting edge of a lathe tool of a machine tool.

It has been proposed to change the convolution circle of a lathe tool of a machine tool by a hydraulic or mechanical adjusting device; however, disadvantages of these proposals reside in the fact that there is a tendency for the machine tool to become unadjusted or misaligned due to centrifugal forces so that the proposed systems become unstable at rotational speeds of less than 10,000 rpm. Moreover, from a constructional point of view, it is especially difficult to accommodate the proposed systems with decreasing rotating diameters since they cannot be arranged in the tool or the like.

The aim underlying the present invention essentially resides in eliminating the disadvantages encountered in prior proposals by providing a method for changing a position of a cutting edge of a lathe tool of a machine tool arrangement that can be carried out in a simple manner, while nevertheless ensuring a high degree of accuracy at high rotational frequencies or speeds.

Another aim of the present invention essentially resides in providing an apparatus for applying the method of the present invention not only for internal but also for external machining of workpieces.

In accordance with the advantageous features of the method of the present invention, it is possible to alter a convolution circle or turned diameter of a cutting edge of a lathe tool of a machine tool by carrying out an adjustment in dependence upon at least one of a rotational frequency and a centrifugal force acting thereon.

By virtue of the features of the method of the present invention, the adjustment of the convolution circle or the turned diameter, of the lathe tool is changed in dependence upon a rotational frequency or a centrifugal force. As the boring spindle is rotatable anyhow, the rotational frequency of the boring spindle can directly be used for changing or altering the effective convolution circle, that is, the working diameter of the lathe tool, because, to each definite rotational frequency, belongs also a definite centrifugal force, which can be brought into play for adjusting the convolution circle of the lathe tool. Consequently, it is possible, with a high degree of accuracy, to allocate to any optional frequency an exactly defined convolution circle.

It has been experimentally determined that by virtue of the features of the present invention, an extremely high working accuracy can be obtained. For example, it is possible, by applying the advantageous features of the method of the present invention, to machine pistons of an internal combustion engine in a circumferential direction and/or in a longitudinal direction with different working radii. In this manner, it is possible to machine a piston, for example, not only in a round fashion up to an approximate high degree of mathematical precision, but also over a circumference and/or length thereof in a crowned or oval manner.

Moreover, by virtue of the features of the present invention, the possibility exists to produce impressions with a very high degree of accuracy by changing the rotational frequency of the actuator at the circumference of the workpiece to be machined and/or in a longitudinal direction thereof in such a manner that the desired contour of the workpiece results in any given time.

The method of the present invention can be carried out in a simple manner by using a dynamically controlled motor driving the boring spindle and the actuator, respectively. Such motors are relatively poor in inertia so that they approximately change their speed of rotation and thus their rotational frequency in a manner similar to an oscillator at high revolutions such as 18,000 rpm after a few angular degrees of each rotation. Such a motor can be coaxially arranged to a boring bar or actuator and, in this manner, a construction is possible which enables a very compact design. Accordingly, to each rotational frequency is allocated a definite adjusting path of the lathe tool and therewith a definite diameter of the convolution circle.

As can be appreciated, the method of the present invention may, for example, not only be used for machining bores of piston bolts and peripheral surfaces of pistons but also for other purposes.

To enable an internal machining, in accordance with advantageous features of the device or apparatus of the present invention, a lathe tool, driven by a motor, is arranged in a tool holding fixture and driven through a boring bar or the like. For an internal working between the boring bar driven by a dynamically controlled motor and the lathe tool, at least a spring-resilient coupling member is inserted which, if necessary, indirectly takes up or accommodates the lathe tool and is deformable on a more or less large convolution circle in dependence upon a rotational frequency and of the centrifugal force, respectively.

In order to provide for an external machining, in accordance with advantageous features of another embodiment of the device or apparatus of the present invention, an adjusting system driven by a motor is provided for adjusting the lathe tool arranged in a tool holding fixture. For external working of workpieces between a shape resilient and a shape-stable coupling member receiving the lathe tool, in an actuator, at least one control lever is arranged which is controlled by a rotational frequency and a centrifugal force, respectively, with regard to a movement of the lathe tool.

By virtue of the above-noted features of the present invention, it is possible to provide a machine tool arrangement or construction which may be constructed in a solid manner at any given time and which only includes a few single parts so that the machine devices can be easily maintained. A lifting or raising of the lathe tool is not possible and a resilient coupling member, provided between the adjusting part and the lathe tool, is advantageously manufactured from a spring steel or from an elastic metallic material. The parts of the spring element or resilient coupling member are deformable with increasing rotational frequency and thus with increasing centrifugal force, whereby the lathe tool is accordingly adjusted across the respective boring bar.

In accordance with still further features of the present invention, a machining device apparatus is provided wherein the coupling member includes at least two spring parts diametrically opposed to each other and arranged in slot-like recesses of a boring bar in such a manner that the spring parts or ledges, at least at one end thereof, are removably connected to the boring bar by slotted cheese-head screws, while, at the other end or free end thereof, the ledges hold the lathe tool in a tool holding fixture across a longitudinal axis of the boring bar that projects at its one end from the tool holding fixture above the side limitation provided by the concerned spring ledge, whereby the tool holding fixture is provided coaxially to the recesses arranged in the spring ledges. A longitudinal portion of a distance sleeve is arranged in a bore opening into the recesses that is connected to a bore provided in the axial direction of the boring bar at one side. A double arm adjusting lever is adjustably arranged at a cylindrical pin with the double arm adjusting lever opening with a mass-rich end thereof into a central recess of the boring bar, whereby the adjusting lever with a short lever arm is actuatably connected to the spring ledges.

In accordance with still further features of the present invention, on each side of a longitudinal center line of the actuator is provided a control lever each of which is provided with a roller, with the control lever being connected to a common sleeve-like member which is adapted to embrace the actuator along a portion of a length thereof. Each of the control levers, at one end thereof is perfectly mounted about a respective bolt to a limited extent. The bolts, extend such that longitudinal axes thereof are parallel to each other and the respective rollers are rotatable around each axis that are parallel to the rotating axis of the bolts. The rollers are disposed adjacent to arcuate connecting slide links coupled through a bellow or deformable part with the boring bar. The boring bar is rotatably arranged with an extension member in a roller bearing accommodated in a basket-like adjusting part, to which a rod-like extension member is integrally connected, that supports itself through a thickening part against a shape-stable resilient coupling member which includes, for example, the two spring ledges and which is connected to a coupling part through a thread by a bolt-like extension so that the coupling part struts itself against the lathe tool, that is arranged in a bore being coaxial with the rod-like extension member of the shape stable coupling member.

These and other objects, features, and advantages of the present invention will become more apparent from the following description when taken in conjunction with the accompanying drawing which shows, for the purpose of illustration only, several embodiments in accordance with the present invention.

DETAILED DESCRIPTION

Figure 1:
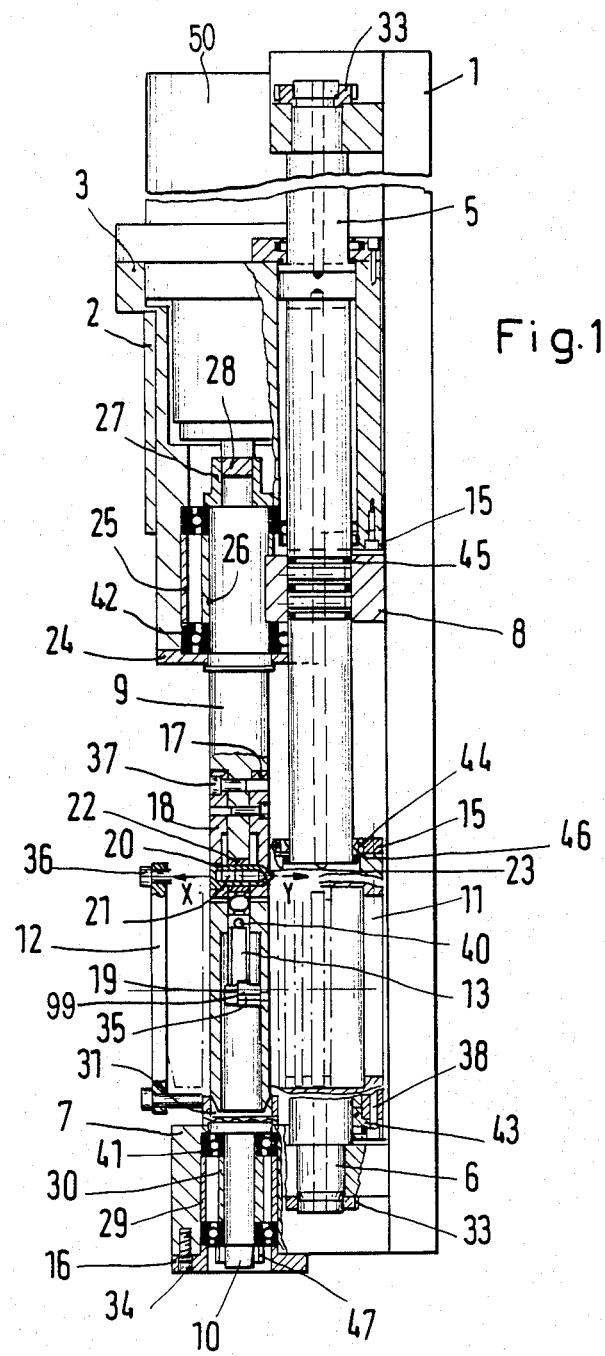
FIG. 1 is a partial cross-sectional longitudinal view of a high speed fine boring spindle arrangement with a cutting edge device for internal machining constructed in accordance with the present invention.
Figure 2:
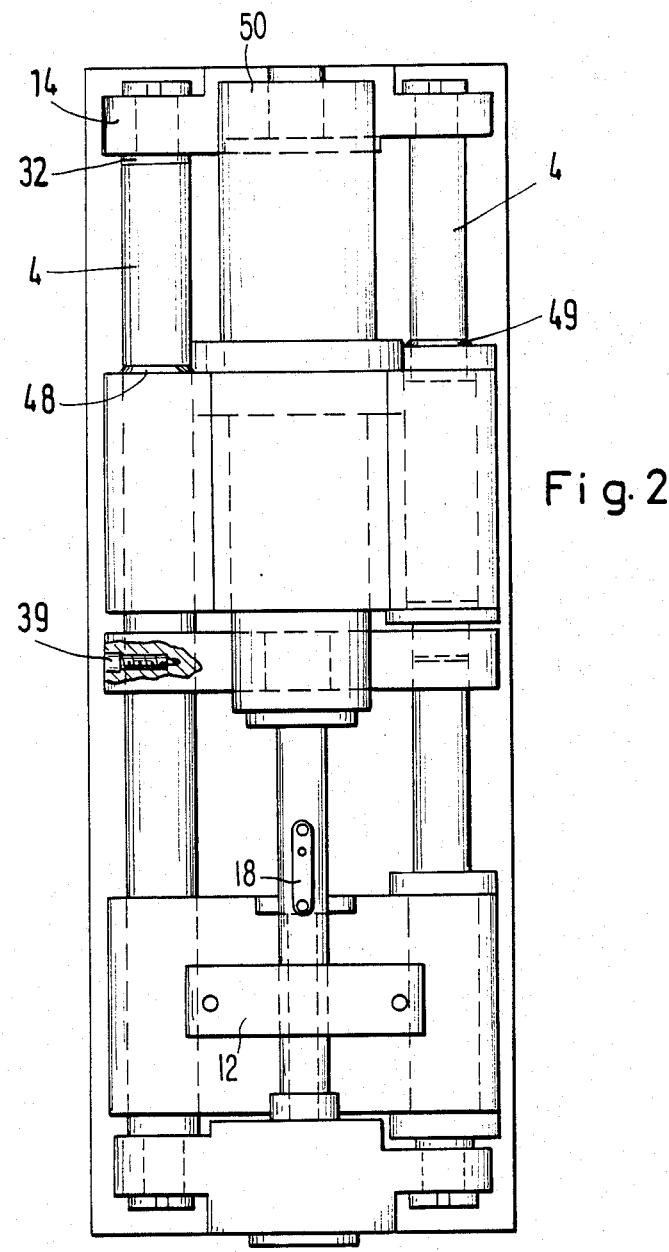
FIG. 2 is a top plan view of the arrangement of FIG. 1.
Figure 3:
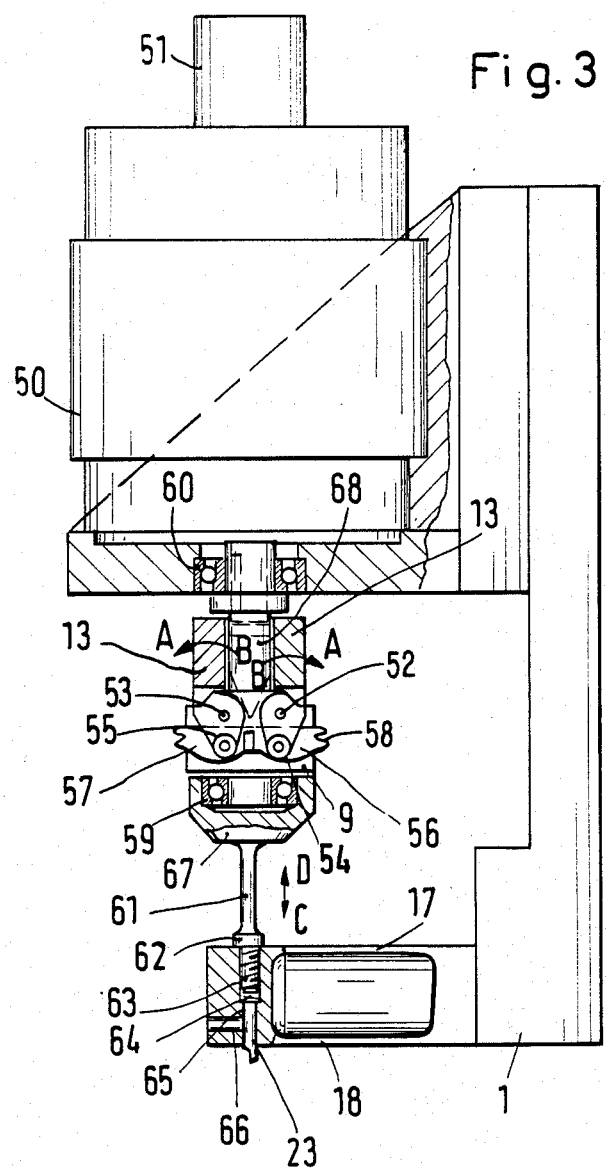
FIG. 3 is a partial cross-sectional view of another embodiment of the present invention for an external machining of workpieces.
Figure 3B:
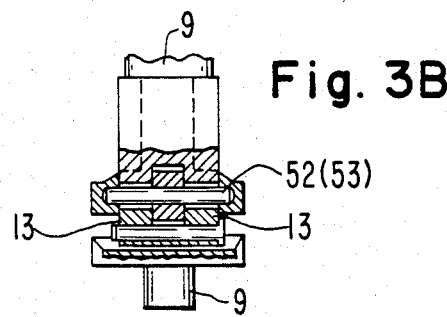
FIG. 3B is a detailed view of a central portion of the embodiment of FIG. 3.
Figure 4:
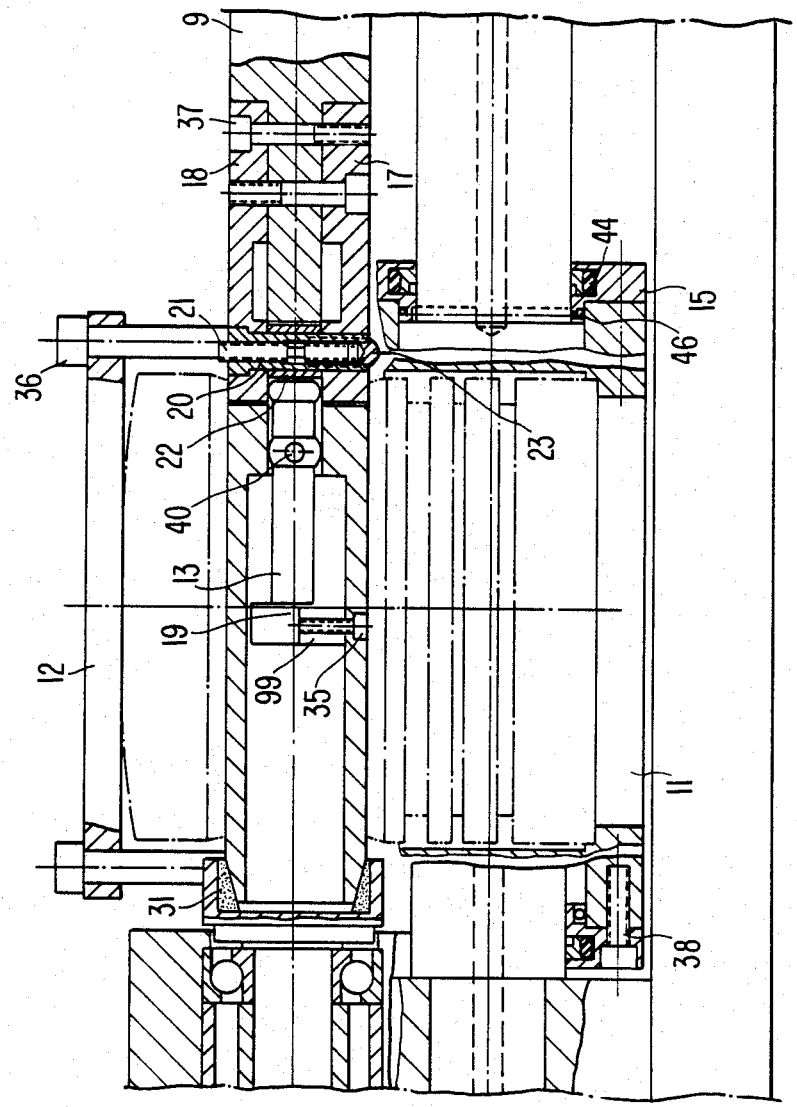
FIG. 4 is an enlarged view of a portion of the boring spindle arrangement of FIG. 1.

Referring now to the drawings wherein like reference numerals are used throughout the various views to designate like parts and more particularly, to FIGS. 1, 2 and 4, according to these figures, a high speed fine boring spindle arrangement is provided with a cutting edge adjustable by a centrifugal force, with the spindle arrangement including a base plate 1 having a motor retainer 2 and a holding sleeve 3 arranged thereon.

Drag rods 4 are provided along with piston rods 5, 6 a bearing block 7, and an intermediate bearing 8. The arrangement further includes a continuous boring bar 9 and a spindle counter bearing 10. A workpiece holding fixture 11 is provided for holding, for example, a piston for an internal combustion engine illustrated in phantom lines in FIG. 1. A holding plate 12 and a double armed adjusting lever 13 are provided, with the adjusting lever 13 being formed or fashioned of a metallic material such as a heavy metal which, for example, may be a sintered material. The holding plate 12 is shown turned (twisted) 90° in FIG. 2 with respect to its position shown in FIG. 1. As shown in FIG. 2, a bearing block 14 is provided and cover members or lids 15, 16 are also provided.

Spring ledges 17, 18 form a shape-stable, spring-elastic coupling member and represent or form legs of a parallelogram, with the spring ledges 17, 18 being formed of, for example, a spring steel. The spring ledges 17 and 18 are diametrically opposed to each other and arranged in slot-like recesses 67 of the boring bar 9 as shown in FIGS. 1 and 2. The spring ledges are connected at one end thereof to the boring bar 9 by slotted cheese-head screws 37. A counterweight 19 and a tool holding fixture 20 are also provided, as well as an adjusting screw 21 and a distance sleeve 22. The counterweight 19 is asymmetrically secured to the lower end of the adjusting lever 13 as shown in FIGS. 1 and 4.

The lathe tool 23 is arranged such that a longitudinal axis is normal, i.e., at a right angle, to a longitudinal axis of the boring bar 9. A lid or cover 24, distance sleeves 25, 26, a coupling device 27, a follower 28, additional distance sleeves 29, 30, a ring 31, a washer 32, and a slotted nut 33 are also provided. Slotted or fillister-head screws 34–39, a cylindrical pin 40, spindle bearings 41, 42 and a rotary shaft seal 43 are provided along with an O-ring 44 sealing rings 45, 46, a slotted nut 47 and shedder or scrimmer elements 48, 49.

A high dynamic frequency controlled motor 50, of conventional construction, is constructed as a cage rotor having an extremely low inertia so that, even at high rotational frequencies such as 18,000 rpm, at each revolution after only a few angular degrees, the speed of rotation is changeable by a frequency control, which results in a corresponding change of the rotational frequency and of the speed of rotation of the boring bar 9, respectively. The cylindrical pin 40 couples the double-armed adjusting lever 13 with the boring bar 9 in a rotatable fixed position, with the adjusting lever 13 being pivotable about the cylindrical pin 40 in dependence upon the controlled speed of rotation and of the rotational frequency, respectively, in a more or less wide range, and thereby deforming the spring ledges 17, 18 in dependence upon at least one of the rotational speed and the centrifugal force always in a more or less strong manner, which brings about an adjusting movement of the lathe tool 23 in the directions indicated by the arrows X, Y in FIG. 1, respectively, by which the effective diameter turned or convolution circle is accordingly changed or altered. As the spring ledges 17, 18 at one end thereof are rigidly connected to the boring bar 9 by the slotted cheese-head screws 37, they may deform themselves only at their opposite end section receiving the lathe tool 23 in the tool holding fixture 20 whereby they may move like the sides of a parallelogram. To make sure that the adjusting lever 13 is only movable in one direction and that it always will return to the same position which it had at the beginning of rotation of the boring bar 9 by motor 50, there is provided an abutment 99 which is secured in the boring bar 9 by means of screw 35 as shown in FIGS. 1 and 4.

In the embodiment of Figures, 3 and 3B, the actuator 9 is again driven by a dynamically controlled motor having a tacho-generator 51 associated therewith. A portion of the actuator 9 is partly embraced by a sleeve-like section of the adjusting levers 13, which are respectively pivotally arranged around bolts 52, 53 by a limited extent in the direction of the arrows A, B, respectively. The adjusting levers, at free ends thereof, are each respectively provided with rollers 54, 55 which are arranged each at an arcuate connecting slide length 56, 57, respectively, of a part of member 58 equipped or provided with a bellows and, accordingly, changeable or variable in longitudinal directions designated by the arrows C, D respectively.

The actuator is, at its end sections, rotatably mounted on roller bearings 59, 60, respectively. The roller bearing 59 is arranged in a basket-like one-sided open adjusting part 67, to which a rod-like extension member 61 is connected, that acts upon the spring ledges 17, 18, respectively, by a shoulder-like thickening part 62. For this purpose, a screw bolt or fastener 63 is integrally connected to the shoulder-like thickening part 62, whereby the screw bolt 63 is threadably inserted into a threaded bore 64. The lathe tool 23 accommodated in a bore 65, projects into the bore 64, whereby the lathe tool 23 is arrestable or securable by a clamping fastener such as a clamping screw (not shown) threadably inserted into the bore 66.

The spring ledges or spring members 17, 18, forming the coupling member, are rigidly but exchangeably connected to the base plate 1 by fastener means such as, for example, screws (not shown). Depending upon the rotational frequency the rollers 54, 55 are movable along arcuate connecting slide lengths 56, 57 thereby shifting the rod-like extension 61 in a direction of the arrow C or D resulting in a corresponding deformation of the spring ledges 17 or 18 in the allocated direction. Accordingly, the legs of the spring ledges 17, 18 adjust themselves in a manner similar to sides of a parallelogram so that an exactly defined convolution circle of the lathe tool 23 results in dependence upon the actual speed of rotation and the rotational frequency, respectively.

While I have shown and described several embodiments in accordance with the present invention, it is understood that the same is not limited thereto but is susceptible to numerous changes and modifications, and I do not wish to be limited to the details shown and described herein but intend to cover all such modifications as are encompassed by the scope of the appended claims.

I claim:

1. A machine tool comprising a lathe tool means, a dynamically controlled motor means for driving the lathe tool means, tool holder fixture means for accommodating the lathe tool means, a boring bar means interposed between the motor means and the lathe tool means for enabling a driving of the lathe tool means by the motor means, wherein, for an internal working between the boring bar means and the lathe tool means, at least a spring resilient coupling means is provided which supports said tool holder fixture means and said lathe tool means accommodated thereby on said boring bar means for movement along a large convolution circle in dependence upon a rotational frequency and centrifugal force and wherein the boring bar means includes diametrically opposed slot-like recess means, the coupling means includes at least two spring members arranged in the diametrically opposite recess means of the boring bar means, means are provided for connecting the respective spring members to the boring bar means in such a manner that first ends of the respective spring members are fixedly connected to the boring bar means and opposite ends thereof are free ends which hold the tool holding fixture means and lathe tool means so that the lathe tool means extends across a longitudinal axis of the boring bar means and projects at one end thereof from the tool holding fixture means through a side surface of one of the spring members, coaxially disposed openings are provided in the spring members for accommodating the tool holding fixture means, a distance sleeve means is arranged in a holding sleeve means provided along an axial direction of the boring bar means, at least one double-arm adjusting lever means is provided which includes a long and short arm, and means are provided for mounting said adjusting lever means so that the long arm thereof extends into a central recess of the boring bar means and the short arm is disposed so as to arcuate at least one of the spring members.

2. A machine tool according to claim 1, wherein said means for connecting the respective spring members include slotted cheese-head screws threadably accommodated in the boring bar means.

3. A machine tool according to claim 2, wherein said means for mounting said adjusting lever means includes a cylindrical pin means disposed in the central recess means of the boring bar means, said lever means being mounted for pivoted movement about said pin means in response to centrifugal force on said lever means during rotation of said boring bar means.

* * * * *